United States Patent Office

PTO - BOYERS, PA Duty Station

MISSING PAGE TEMPORARY NOTICE

PATENT # 6899X FOR ISSUE DATE 1-14-1832

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

All Drawings

Data Conversion Operation

Boyers, Pa

6899X

UNITED STATES PATENT OFFICE.

THOMAS A. WHITIES, OF BELLEFONTAINE, OHIO.

IMPROVEMENT IN PLOWS.

Specification forming part of Letters Patent dated January 14, 1832.

*To all whom it may concern:*

Be it known that I, THOMAS A. WHITIES, of Bellefontaine, in the county of Logan and State of Ohio, have invented a new and useful Improvement in Plows; and I do hereby declare that the following is a full and exact description of the construction and operation of the said plow as invented or improved by me.

This plow is composed of wood and wrought or cast iron and steel. The length from the top of the big handle to the point of the beam is seven feet three inches. The length of the big handle is four feet three inches. The length of the beam clear of the handle is five feet. The height of the big handle is two feet and ten and a half inches. The height of the beam at the point to the under side thereof is one foot three inches. The height of the beam where the collar is fastened to it is one foot six inches. The height of the beam where it enters the mortise in the big handle is one foot one inch. The little handle is of equal height with the big handle, and at the top is distant from the big handle two feet one inch; at the top of the mold-board, from outside to outside, including the mold-board, is two feet; at the bottom, measuring as above, it is one foot one and one-half inch. A brace is let into the beam three inches from the big handle, three inches square at the top, and four inches by five at the bottom. It is two feet five inches long, projecting forward, so that the distance between the center of the bottom of the big handle and the center of the bottom of the brace is one foot four and a half inches. A second brace is put into the beam, the center of the mortise on the top of the beam being one foot nine inches from the big handle, projecting backward to the second brace, at its junction with which it is four and a half inches from the bottom of the beam, and being on a straight line to the foot of the big handle at the point where the upper edge of the landside meets it. This brace is three inches square at the beam and swells forward to fill up the space to the counter. Both braces are beveled to fit against the mold-board. The foregoing is wood. The handles and beam are of the ordinary dimensions.

The landside is one foot six inches long, four inches wide, one inch thick at the bottom, and tapering, so as to be one-third of an inch at the top, continuing this thickness thirteen inches. Then the thickness is reduced to one-third of an inch for the whole width, and this latter part is bent toward the plow, forming a shoulder to receive the lap of the colter part of the landside.

The mold-board, when of cast-iron, is of one piece, and when of rolled iron, it is in two pieces; and in the latter case it is, when put together, one foot four inches high from the point to the heel. On the lower edge it is two feet long, and on the upper edge, passing back over the little handle half an inch, it is two feet six inches long. Before it is hollowed out to the shape of the colter-bar, from the ground to the beam, on the upper edge, it runs on a straight line two feet three inches. Then it bends toward the little handle, so that it is on a straight line from top to bottom at the little handle. After descending six inches on the mold-board it is on a straight line at any place from the colter-bar. To the hind end of the board it is countersunk, for the share, one third of an inch, the lowest piece one-half inch thick, three and one-half inches wide the whole length, the upper piece one-fourth inch thick, lapped one inch on the other, fastened with rivets.

The colter is so framed that a part of it is also a part of the landside, and from the point of connection this piece on the land is one foot long, and after the colter rises so high as to leave it it is four inches wide and one inch thick, and is beveled on the inside to meet the shoulder of the landside, which it is made to fit. The colter-bar is two inches wide and half an inch thick. The side to the land being raised and the other being hammered to the slope of the mold-board, it rises from the point so far on a straight line that the remainder of the distance to the beam it is a semicircle of fourteen inches diameter, where it is flattened, and a hole for a screw-bolt, and lies against the wooden braces all the way round.

The share from the extreme point is eighteen and one-half inches long, three and one-half inches wide, and three-eighths of an inch thick; a safety-bar from the connection of the upper edge of the landside with the big handle to the beam, at the mortise for the second brace, passing over the joint of connection of the two braces, and being countersunk in the wood, it is twenty-one inches long, one and one-half inch wide, and one-fourth of an inch wide. A plate of steel is affixed to the lower side of the share twenty inches long, two and one-half inches wide, and one-fourth of an inch thick, put on the share with a lap of three-fourths of an inch, and fastened with four rivets or screws. A nose-piece of steel is on the colter, made after the manner of a socket. It extends forward four inches from the extreme point of the share, and back on the upper side as far as the top of the share, and on the under side nine inches from the point. It has a flange of one-half an inch, that runs from the bottom to the top of the share, and, extending over it, it is fastened to the colter with two screws on the upper side.

The plow is held together by the following screw-bolts of the ordinary size and necessary length, viz: Three bolts fasten the mold-board to the braces. Two bolts fasten the mold-board to the little handle—one at the top and one at the bottom. One bolt fastens the colter to the beam. Two bolts fasten on the share. The one that is forward passes through the mold-board and the lap of the two pieces that form the landside, and perfectly securing them, the outside piece being countersunk to receive the lap, the other at the back end of the share fastening it and the mold-board together. Three bolts fasten the safety-bar—one to the big handle, one to the braces at their junctions, and one to the beam—securing the tenon of the brace, which there passes through it.

From the peculiar construction of this plow the inventor believes that it will run much lighter than any now in use, turning over an equally large if not a larger furrow, and it may be used in the foulest land without choking.

THOMAS A. WHITIES.

Witnesses:

JOSEPH ROBB,

R. PATTERSON.